Patented Dec. 1, 1942

2,303,488

UNITED STATES PATENT OFFICE 2,303,488

PROCESS FOR MAKING BREAD

Elmer M. Moore, Kansas City, Mo., assignor to Campbell Taggart Research Corporation, Kansas City, Mo., a corporation of Missouri No Drawing. Application March 6, 1940, Serial No. 322,487

4 Claims. (Cl. 99—90)

This invention relates to a process for making bread and more particularly to the manner in which salt, as an ingredient, is incorporated in the dough, the principal objects of the invention being to provide a practical, more economical and efficient process for making bread.

The normal procedure in a process of making bread, a sponge dough process for example, with white, wheat and/or rye flour for example, is to prepare a sponge of, for example, suitable quantities and qualities of flour, water and yeast, and dough conditioners, the flour being in the proportion by weight of approximately from fifty per cent (50%) to seventy-five per cent (75%) of the total amount of flour in an ultimate mass of dough. The sponge so formed is then allowed to ferment for a suitable length of time. The fermented sponge is usually placed in a mechanical mixer and additional flour and water, and salt, and other optional so-called ingredients, such as sugar, milk and shortening, are applied to the sponge to make a dough of desired consistency, which dough is customarily mechanically mixed to produce the desired development of the dough. The amount of mixing required to properly develop the dough is influenced by a number of factors, chief among which is the characteristics of the flour used in the dough. The dough mass is preferably segregated into suitable units and then baked.

The sponge is preferably fermented to a temperature of approximately from eighty-five degrees F. (85° F.) to eighty-eight degrees F. (88° F.), and it has been found to be preferable to maintain the dough mix at a temperature of approximately eighty degrees F (80° F.). The temperature of the flour and other ingredients used in the dough mix varies considerably depending upon atmospheric conditions in the place of storage of the flour and ingredients and sometimes reaches a temperature of ninety degrees F. (90° F.) and higher, particularly during periods of warm weather. Frictional heat proportional to the amount of mechanical mixing is also developed during the mixing of the sponge and dough, all of which have necessitated refrigeration of the dough during its mixing operations, sometimes by the provision of water-jackets around the mixer through which ice-water, brine or other suitable heat transfer medium may be circulated. Ice-water is also sometimes used in the dough to facilitate maintenance of the dough at the desired temperature.

More particularly, the objects of the invention are to reduce the total mixing time required for the dough; to reduce the amount of refrigeration necessary in maintaining the dough at a desired predetermined temperature; to increase the absorptive characteristics of the dough to thus produce a greater yield of dough; and to provide improved steps and arrangements of steps in a process of the character noted for producing a baked product having uniformly good flavor, color, texture and keeping qualities.

In accomplishing these and other objects of the present invention and in carrying out my process, a sponge is preferably prepared, preferably in the usual manner above pointed out. The prepared sponge is applied to a suitable, preferably mechanical, mixer and a dough is prepared from the sponge by the addition thereto of flour, water (preferably ice-water) and the usual ingredients such as sugar, milk and shortening, but not salt, in accordance with predetermined desired formulae.

The salt, as a customary ingredient of the dough, is temporarily withheld from the dough mix.

The dough mix, consisting of the sponge and added flour, water and ingredients, except salt, is then preferably mechanically mixed for a period of time sufficient to form a dough "mass"; that is to say the dough is mixed until it reaches a level of hydration at which the gluten in the dough develops uniformly adhesive qualities of a character capable of "holding" the dough in a coherent mass.

As a practical matter, an explanation of the mixing operations is that the mixing of the dough is divided into two parts. During the first part of the mixing operation, the water is being absorbed by the protein in the flour. The absorption of the water by the protein forms the gluten which gives the dough its properties of a coherent plastic mass with some elasticity which allows the dough to be stretched. This absorption of the water by the protein does not take place instantly but is a gradual process extending through the early part of the mixing period. When the absorption of the water has been completed, the dough becomes a coherent mass and this point can be readily observed in the mixer.

The second part of the mixing operation is the development of the dough through the mechanical action of the mixer in stretching and kneading the coherent dough mass. This mechanical action alters the physical properties of the dough and brings the dough to the proper physical condition to make good bread. The amount of time required in this second part of the mixing action to produce the necessary physical conditions is a variable that depends not only on the characteristics of the different flours, but also on the size of the doughs and the kind of mixer.

By temporarily withholding the salt from the dough, it has been found that the time required to form the coherent dough mass and that the total time required for mixing the dough are reduced. The reason for the reduction in time normally required for the mixing operation is that salt affects the rate at which the protein of the flour absorbs the water and forms the gluten. When, as here, salt is absent, the water is absorbed at a more rapid rate; the gluten forms more rapidly; and, therefore, the dough becomes a coherent mass in less time. It has also been found that less refrigeration is required to maintain the dough at a desired predetermined temperature, partly because of the greater amount of water in the dough and partly because of the less mixing time required. It has further been found that the dough absorbs more water than when salt is added with the other ingredients at the start of the mixing operation, and that a greater yield of dough consequently results therefrom.

When the dough, upon being mixed, reaches a coherent "mass" stage, as above pointed out, salt may be added, preferably in dry form, at or subsequent to the formation of said "mass," in quantities according to a given formula for the product to be produced from the dough mass.

The added dry salt has been found to readily go into the dough mass upon further mixing of the dough and its hygroscopic nature assures uniform assimilation of the salt in the dough.

After admixture of the salt in the dough mass, mixing of the dough is continued until it reaches a desired mechanical development, after which the dough may be segregated in suitable units and baked according to suitable practices. The products resulting from a dough mass so prepared are found to have good flavor, color, texture and keeping qualities.

It is apparent, therefore, that I have provided, by the present invention, a practical, more economical and efficient process for making bread in which, among other things, the manner of incorporating salt in the dough plays an important part.

What I claim and desire to secure by Letters Patent is:

1. In a process of making bread, the steps of first forming a dough-mix including water, omitting substantially all salt from the dough-mix, next forming a coherent mass from the dough-mix by kneading the same until absorption of the water has been completed, whereby said coherent mass is formed in a reduced time relative to formation thereof when substantially all salt is incorporated in the dough at the outset of the mixing stage thereof, then separately incorporating substantially all salt in the coherent mass subsequent to completion of formation of said coherent mass, and finally baking the coherent mass in suitably segregated units.

2. The process of making bread consisting of mixing flour, water, yeast and optional ingredients, except salt, by suitable kneading until absorption of the water has been completed sufficiently to form a coherent mass, adding substantially all salt to the coherent mass so formed subsequently to formation of said coherent mass, continuing mixing said coherent mass sufficiently to effect desired development of said coherent mass, and baking the developed coherent mass in suitably prepared units.

3. In a process of making bread; forming a sponge of flour, water, yeast and optional ingredients, omitting substantially all salt from the sponge, fermenting the sponge, forming a dough-mix from the fermented sponge and the remainder of ingredients of a given bread formula, except salt, forming a coherent mass from the dough-mix by kneading the same until absorption of the water has been completed, adding substantially all salt to the coherent mass subsequent to completion of formation of said coherent mass, distributing the salt throughout the mass, and baking the mass in suitably segregated units.

4. In a process of making bread; forming a sponge of flour, water, yeast and a dough conditioner, omitting substantially all salt from the sponge, allowing the sponge to ferment; mixing flour, water, sugar, milk and shortening with the sponge until absorption of the water has been completed sufficiently to form a coherent dough-mass; adding salt to the dough-mass after the mass reaches a coherent stage, uniformly distributing the salt through the mass by additional mixing thereof, sufficiently to effect desired development of said coherent mass, and baking the coherent dough-mass so prepared in suitably segregated units to produce bread.

ELMER M. MOORE.